(12) United States Patent
Livingston

(10) Patent No.: US 10,760,715 B1
(45) Date of Patent: Sep. 1, 2020

(54) CABLE TIE DEVICE

(71) Applicant: Aaron Livingston, Ladysmith, WI (US)

(72) Inventor: Aaron Livingston, Ladysmith, WI (US)

( * ) Notice: Subject to any disclaimer, the term of this patent is extended or adjusted under 35 U.S.C. 154(b) by 0 days.

(21) Appl. No.: 16/508,627

(22) Filed: Jul. 11, 2019

(51) Int. Cl.
*F16L 3/233* (2006.01)
*H02G 3/32* (2006.01)
*B65D 63/10* (2006.01)

(52) U.S. Cl.
CPC .............. *F16L 3/2334* (2013.01); *H02G 3/32* (2013.01); *B65D 63/1072* (2013.01); *B65D 2563/108* (2013.01)

(58) Field of Classification Search
CPC ......... F16L 3/2334; F16L 3/137; F16L 3/233; F16L 3/12; F16L 3/23; F16L 3/2332; H02G 3/32; B65D 63/1072; B65D 2563/108
See application file for complete search history.

(56) References Cited

U.S. PATENT DOCUMENTS

| | | | |
|---|---|---|---|
| 3,149,808 A * | 9/1964 | Weckesser | F16L 3/233 248/74.3 |
| 3,471,109 A * | 10/1969 | Engelbert | F16L 3/2332 248/68.1 |
| 3,653,096 A * | 4/1972 | Fernberg | F16L 3/12 24/16 PB |
| 4,214,349 A | 7/1980 | Munch | |
| 4,389,754 A | 6/1983 | Sohma | |
| 4,490,886 A * | 1/1985 | Omata | F16L 3/233 24/16 PB |
| 5,135,188 A * | 8/1992 | Anderson | B65D 63/1063 24/16 PB |
| 5,746,401 A * | 5/1998 | Condon | F16L 3/133 248/62 |
| 6,105,908 A | 8/2000 | Kraus | |
| 6,149,109 A | 11/2000 | Stankowski | |
| 6,186,451 B1 * | 2/2001 | Benoit | F16L 3/233 24/16 PB |
| 7,740,210 B2 | 6/2010 | Pilon et al. | |
| 7,762,503 B2 | 6/2010 | Franks | |
| 7,774,905 B2 | 8/2010 | Geiger | |
| 7,934,297 B2 | 5/2011 | Williams et al. | |
| 9,038,246 B2 * | 5/2015 | Liang | B65D 63/1072 24/16 PB |
| 9,121,528 B2 | 9/2015 | Foreman et al. | |
| 9,266,654 B1 | 2/2016 | Scott et al. | |
| 9,939,086 B1 | 4/2018 | Mangone, Jr. | |
| 2012/0152587 A1 | 6/2012 | Lemire et al. | |
| 2012/0272486 A1 | 11/2012 | Murphy et al. | |
| 2014/0224533 A1 * | 8/2014 | Brey | H02G 3/105 174/480 |

* cited by examiner

*Primary Examiner* — Anita M King
(74) *Attorney, Agent, or Firm* — Anthony J. Bourget

(57) ABSTRACT

A clip, system and methods for affixing a conduit to a surface includes a flexible strap having an integrally connected shoulder with a passageway configured to receive a fastener to secure the shoulder and clip to a surface of an object such as a stud, the shoulder positioned at a first end portion of the strap, the strap having an opposite free end, and a head integrally connected to the strap at a terminal end of the first end portion, the strap being flexible between the head and the shoulder, the head having a strap-receiving passage configured to receive the strap to form a loop. The clip is connected to the surface and the loop is tightened around the conduit to secure the conduit to the surface.

17 Claims, 7 Drawing Sheets

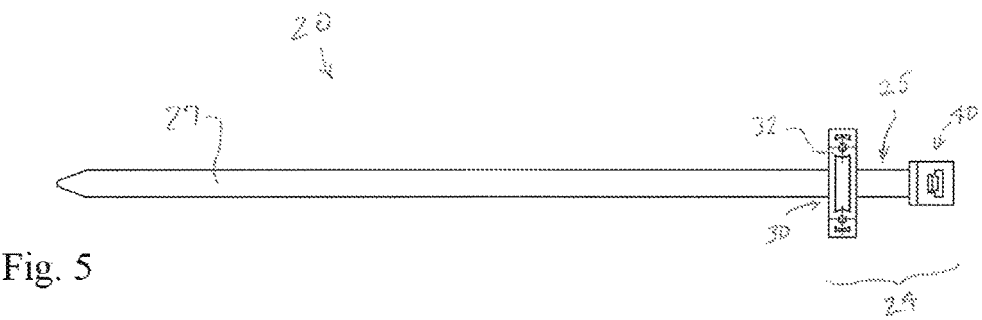
Fig. 5
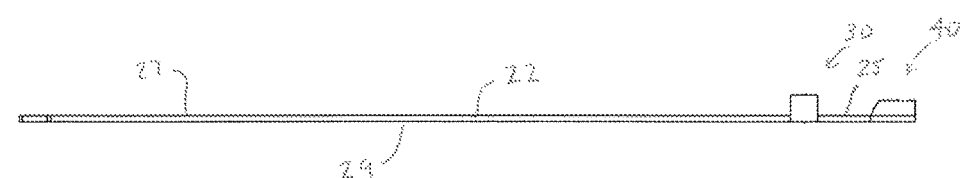
Fig. 6
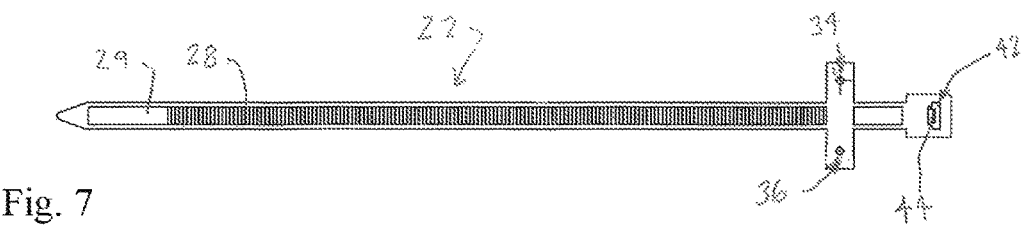
Fig. 7
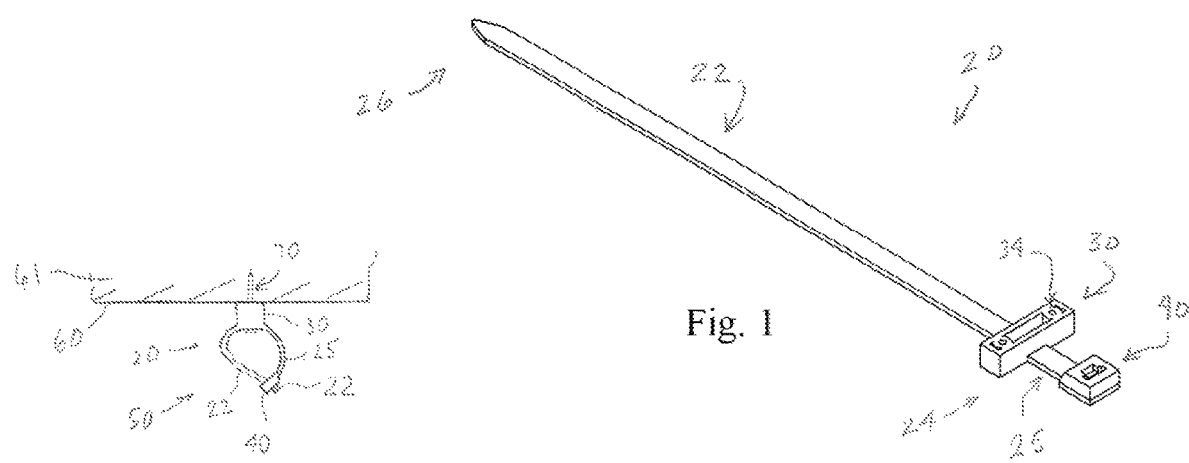
Fig. 4
Fig. 1

CABLE TIE DEVICE

BACKGROUND OF THE INVENTION

1. Field of the Invention

The present invention relates to clips for affixing one or more cables, wires, conduits, pipes, tubes or other items to a surface in a desired location, and related systems and methods of use.

2. Background Information

Electrical cables, conduits, wires, pipes, tubes or other items run close together for various projects. If a conduit or group of conduits, for instance, are not affixed in place, they can become difficult to handle or identify, can become tangled or damaged or unworkable or unsightly. There are many different types of clips or cable ties on the market for bundling or securing in place conduits and the like. In some applications when stringing electrical conduit, workers seek to secure the conduit or multiple conduits to a stud before the conduit is introduced into an electrical box. In some cases, a worker will secure an electrical conduit to a stud by using a plastic U-shaped staple. In other cases a worker may attempt to secure the conduit using one of the other types of clips or cable ties on the market. While present clips or cable ties have benefits, there is room for improvement.

SUMMARY OF THE INVENTION

Electricians and other workers who run conduit or connect conduits to fixtures often tie-down the conduit for convenience or are required to secure the conduit adjacent electrical boxes or other fixtures. Electricians often use staples for such purposes. The staples or other products can be difficult to apply or do not work properly for many applications. There is a need for a clip that can be easily applied and which safely secures conduit into a desired position. In one aspect the invention includes a clip configured to form a smooth loop which wraps around conduit and which can be conveniently and securely connected to objects such as wall studs or other objects. The clip includes a head having a passageway to receive a free end of a strap of the clip. A shoulder is configured to receive a fastener to connect the clip to a stud or other object. The head is connected to the shoulder by a flexible neck portion which assists in forming a smooth loop to receive and secure conduit. In one aspect the clip is a one-piece flexible plastic clip configured to receive a fastener to secure the clip to a stud and configured to wrap around conduit by passing the free end of the strap through the passageway of the head.

In a further aspect the invention includes a clip having at least one fastener set within a shoulder such that the shoulder may be fastened to a stud or other object by inserting the fastener into the stud or other object, and where the clip includes a flexible strap integrally connected at one end of the shoulder which inserts into a passageway of a head which is integrally connected to a flexible neck portion integrally connected to the shoulder at an opposite end of the shoulder. In one aspect the fastener is molded-in-place during manufacture of the plastic clip.

In a further aspect the invention includes a method of securing a plastic clip to an object by inserting a fastener into the object where the fastener passes through a passageway of a shoulder of the clip, wrapping a strap which extends from the shoulder of the clip at least partially around a conduit to be secured against or adjacent the object, and inserting a free end of the strap into a head of the clip where the head is connected to the shoulder by a flexible neck which allows the head and flexible neck to at least partially wrap about the conduit. The strap is pulled further through a passageway at the head of the clip to tighten a loop formed by the strap and neck about the conduit.

The above partial summary of the present invention is not intended to describe each illustrated embodiment, aspect, or every implementation of the present invention. The figures and detailed description and claims that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which:

FIG. 1 is a perspective view of a cable tie device in accordance with one aspect of the present invention.

FIG. 4. Is an elevation view of the cable tie device of FIG. 1 in a further use mode.

FIG. 5 is a top view of the cable tie device of FIG. 1.

FIG. 6 is a an elevation view of the cable tie device of FIG. 1.

FIG. 7 is a bottom view of the cable tie device of FIG. 1.

Figure 2:
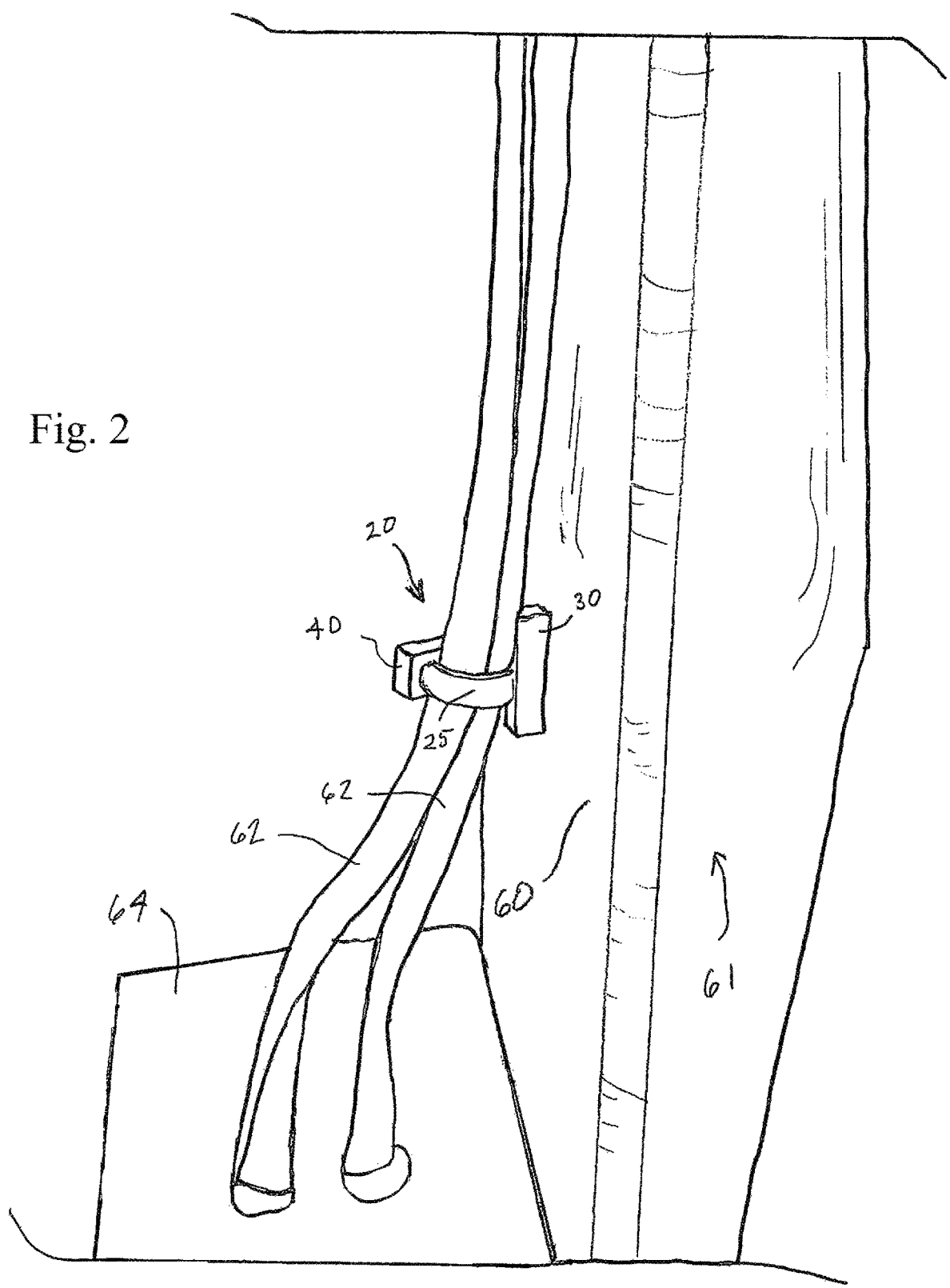
FIG. 2 is a perspective view of the cable tie device of FIG. 1 in one example use mode.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Figure 3:
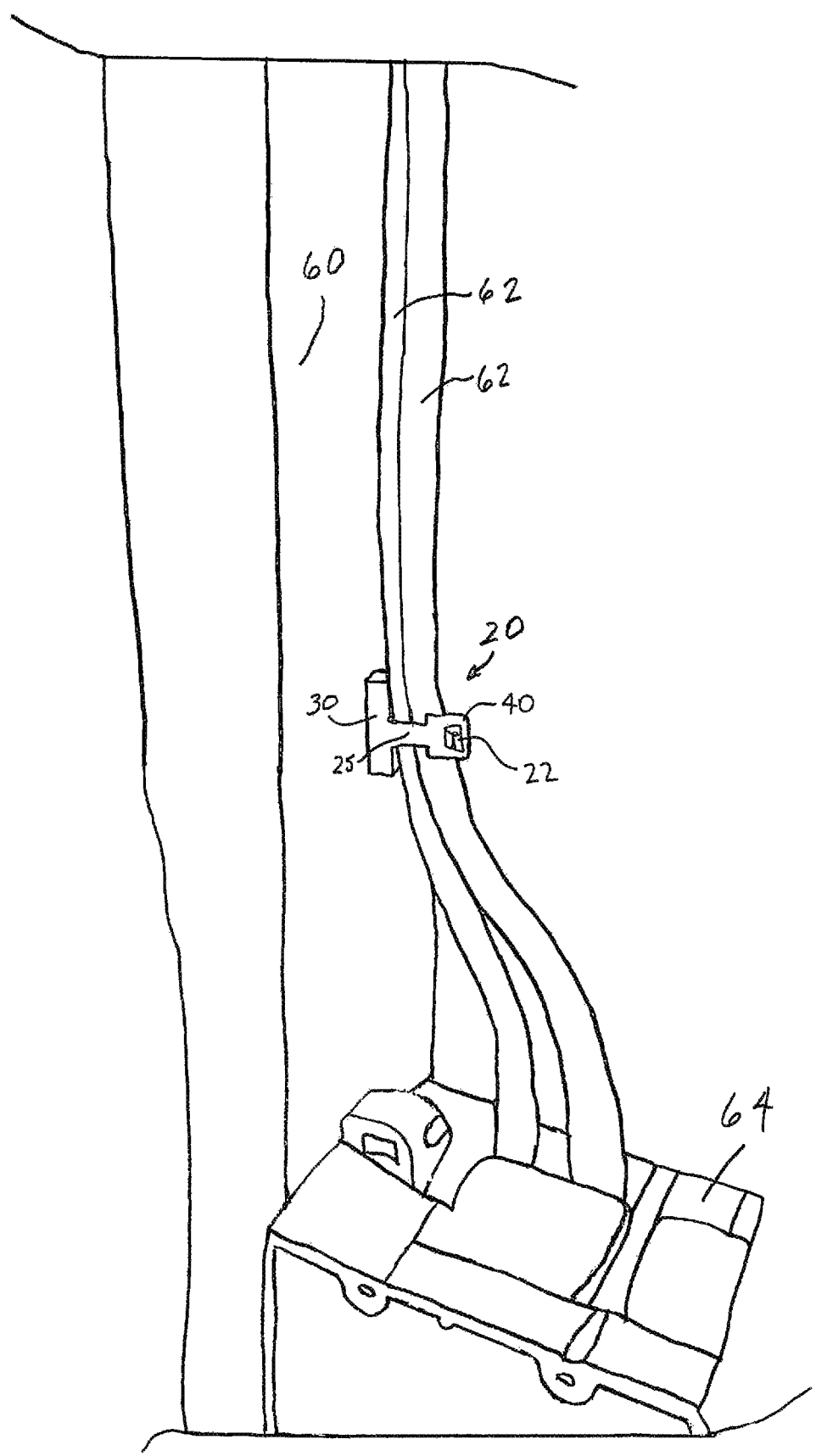
FIG. 3 is a reverse perspective view of the cable tie shown in FIG. 2.

Referring to FIGS. 1-14, aspects of the device, systems and methods are shown. FIG. 1 is a perspective view of a cable tie clip 20 for affixing a conduit to a surface. FIG. 2 is a perspective view showing clip 20 formed into a loop 50 and fastened to a surface 60. The surface 60 in this example is the surface of a wood stud 61. The clip 20 may also be fastened to different objects. A conduit 62, multiple conduits 62, cable or other item is contained within the loop 50 of device 20. In one instance the conduit 62 or multiple conduits 62 extend to an electrical box 64. FIG. 3 is a reverse angle perspective view of the clip 20 shown in FIG. 2. As shown in FIG. 3, an excess portion of strap 22 which passes through passageway 42 of head 40 has been removed for convenience. FIG. 4 is an illustration depicting a reverse image of the clip 20 of FIG. 2 formed into a loop 50 with shoulder 30 fastened to surface 60 of a representative object such as a stud 61. FIG. 4 shows clip 20 in a relatively tight loop 50 and where the conduit 62 are removed for clarity. An excess portion of strap 22 has been cut for convenience after strap 22 has been inserted into head 40. The loop 50 may be narrowed by pulling strap 22 through head 40 as is typically accomplished using cable tie fasteners. Multiple conduits 62 may be fastened within loop 50 of clip 20.

In further reference to FIG. 1, in one aspect clip 20 includes a flexible strap 22 having a shoulder 30 and a head 40. Shoulder 30 is positioned at a first end portion 24 of strap 22. Strap 22 has a free end 26 positioned opposite first end portion 24. Head 40 is positioned at a terminal end of first end portion 24. Head 40 has a strap-receiving passage 42 (see FIGS. 7, 8, 9) configured to receive strap 22 to form a loop 50. Particularly, free end 26 is inserted into passage 42 of head 40 to form loop 50.

FIG. 5 is a top view of clip 20 showing shoulder 30 having an upper side 32. The upper side 32 of shoulder 30 is placed against a surface 60 for mounting to the surface of an object such as a stud 61. Fasteners, such as nails or screws, are used to fasten the shoulder 30 to a stud or other object as described further herein.

FIG. 6 is an elevation view of clip 20 showing strap 22 extending generally flat and having shoulder 30 and head 40 projecting upward from upper side 27. In one aspect clip 20 is made of plastic and is molded so that strap 22 is naturally oriented relatively flat, and neck portion 25, which is positioned between shoulder 30 and head 40, is also generally flat. When clip 20 is in an unstressed or unflexed natural state, head 40 extends generally straight outward from shoulder 30 as shown in FIG. 6 (i.e., generally along a plane). As described below, neck portion 25 is flexible and allows head 40 to be bent downward (or upward) to more readily expose strap receiving passageway 42 to receive free end 26 of strap 22. Such flexibility also allows clip 20 to conform to the shape of a conduit or bundle of conduits positioned within loop 50. In one aspect, head 40 and shoulder 30 comprise a first end portion, with strap 22 positioned at an opposite end of the clip 20.

FIG. 7 is a bottom view of clip 2. In one aspect ratchet teeth 28 are positioned on at least one side of strap 22. In this aspect ratchet teeth 28 are positioned on bottom side 29 of strap. In some aspects teeth 28 may be provided on top side 27. Ratchet teeth 28 are configured to engage with a tang 44 located within passage 42 of head 40. Head 40 and strap 22 with teeth 28 operate as is common with standard cable ties or zip strips. A free end 26 inserts into passageway 42 of head 40 where teeth 28 engage with a tang 44 positioned within the head 40 to form a loop and secure conduit within the loop 50. In one aspect, the teeth 28 are locked against tang 44 so that strap 22 is locked into position within head 40 and cannot be readily removed. In some aspects tang 44 is flexible or somewhat flexible to allow placement of strap 22 into head 40 where teeth 28 ratchet against tang 44 during insertion. In one aspect tang 44 is hinged against a base of head 40. As shown in FIG. 7, strap 22 has a maximum width, and in one aspect, a distance between the first passageway 34 and the second passageway 36 is greater than the maximum width of the strap 22.

Figure 8:
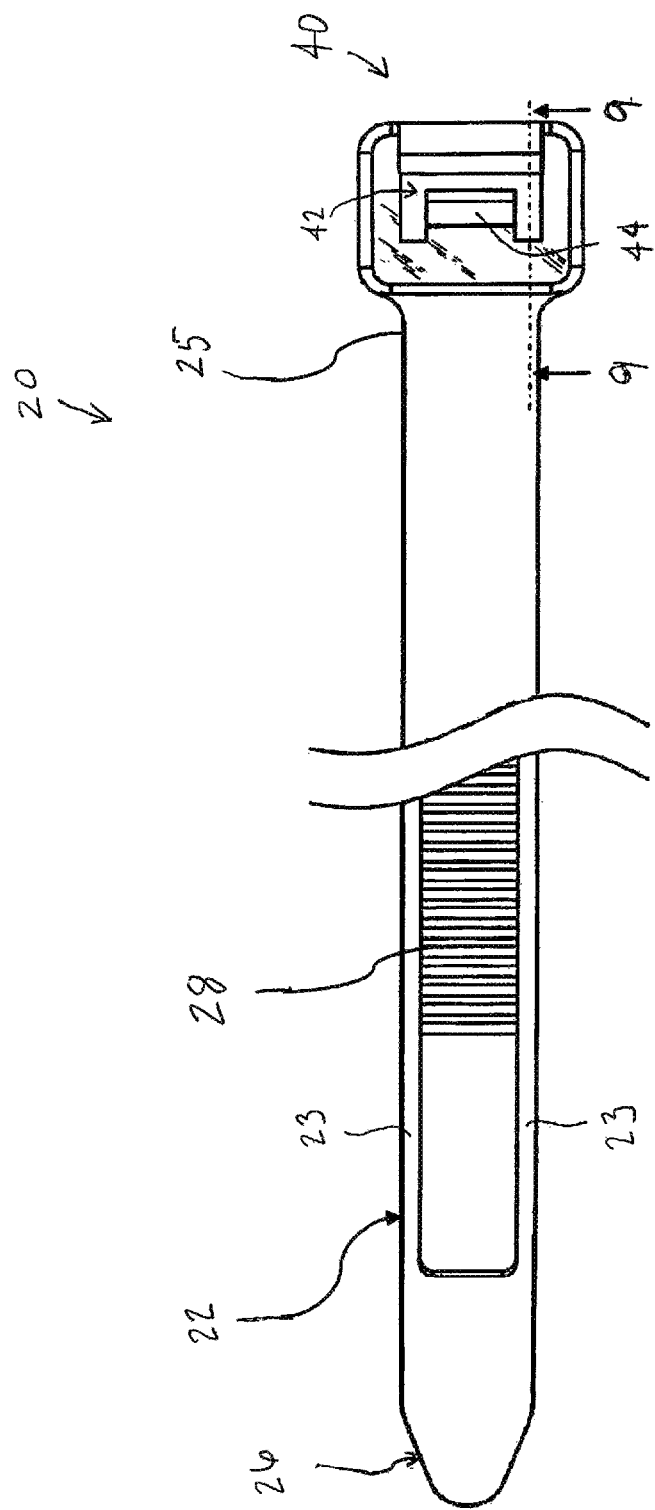
FIG. 8 is a partial top view of the cable tie device of FIG. 1.
Figure 9:
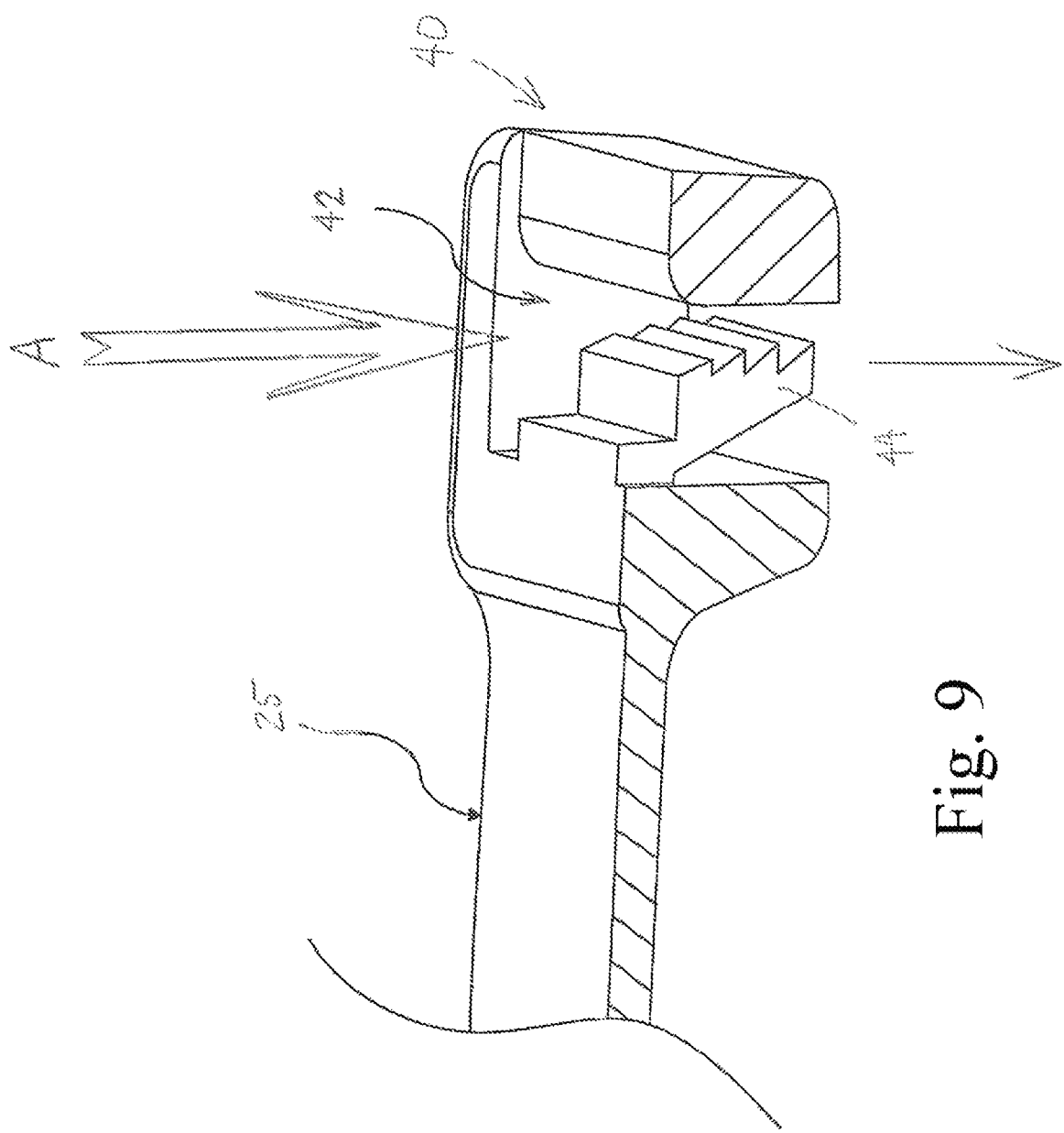
FIG. 9 is a section view taken along line 9-9 of FIG. 8.

FIG. 8 shows one aspect of a representative strap 22 with head 40, passage 42 and tang 44 arrangement. FIG. 9 is a section view of head 40 taken along line 9-9 of FIG. 8. Insertion of strap 22 along the direction represented by arrow A securely locks strap 22 into head 40. Particularly, as strap 22 is inserted into passage 42, teeth 28 engage against tang 44. Tang 44 may flex as each of the teeth pass by and may include a corresponding mating step to lock the strap 22 within passage 42 as may be appreciated. Different structures of teeth, tang and locking structures may be used with head 40. In one aspect, when fastener 70 is inserted into shoulder 30, the fastener 70 is aligned parallel to the strap-receiving passage 42 of head 40 when the head 40 is positioned in a non-flexed position. For instance, the clip 20 is constructed such that the strap and neck and head are oriented generally planar when clip is not flexed.

In further reference to FIG. 2, clip 20 is secured to a surface 60, such as a wooden stud 61 or other object. In one aspect, clip 20 is secured to stud 60 by use of a fastener 70 passing through shoulder 30. For instance, a nail 72 inserts through shoulder 30 and into stud or surface 60. When clip 20 has been secured to surface 60, strap 22 inserts into head 40 to form a loop 50 for securing conduit 62. Particularly, conduit 62 is placed against bottom side 29 of strap 22 (or placed into the area to be defined inside loop 50). The free end 26 inserts into passage 42 and strap 22 is pulled through passage 42 to snugly secure conduit 62 within loop 50. Tightening the loop 50 secures the conduit 62 tightly against the stud 61 at surface 60. A single conduit 62 or multiple conduits 62 or other objects may be bundled together within loop 50 and secured to surface 60. A portion of the free end 26 which extends from head 40 is removed to avoid clutter, for instance.

To facilitate ease of affixing conduit 62 to surface 60, head 40 of clip 20 is flexibly connected to shoulder 30. Such flexibility allows head 40, and neck portion 25 which is positioned between head 40 and shoulder 30, to adjust to conform around conduit 62. Such flexible adjustment accommodates for creation of a smooth loop 50 to receive and wrap around the conduit 62. Head 40 is pulled backward or outward (toward bottom side 29) from shoulder 30 to conveniently present passage 42 to receive free end 26. Such flexibility of neck portion 25 also allows for forming a relatively tight loop 50 as shown in FIGS. 2-4. Moreover, bottom side 29 is devoid of obstruction or projections which would otherwise interfere with a conduit 62 secured within loop 50. The ratchet teeth 28 in one aspect are set between opposite rails 23. In one aspect the rails 23 are the lowermost portion of the strap 22. Thus, the bottom side 29 is generally flat (other than for the teeth 28 which in one aspect do not project downward beyond rails 23. Having a flat or generally flat bottom side 29 allows for a snug fit of conduit 62 within loop 50 when strap 22 is wrapped around the conduit 62 and secured into position and pulled tight through passage 42.

Figure 10:
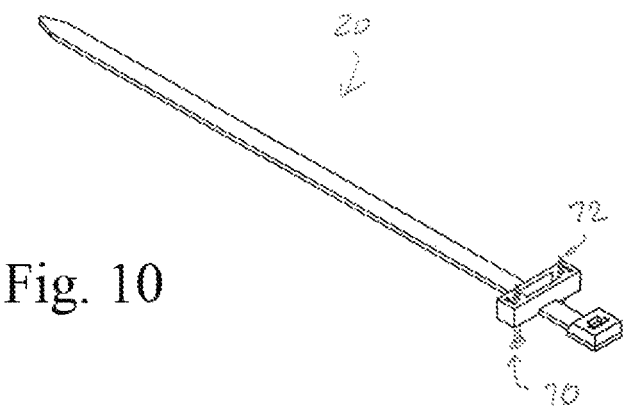
FIG. 10 is a perspective view of a cable tie device in accordance with a further aspect of the present invention.
Figure 11:
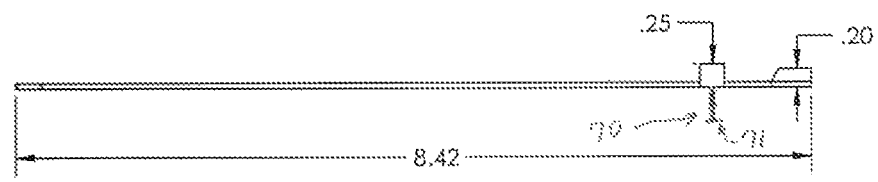
FIG. 11 is an elevation view of the cable tie device of FIG. 10.
Figure 12:
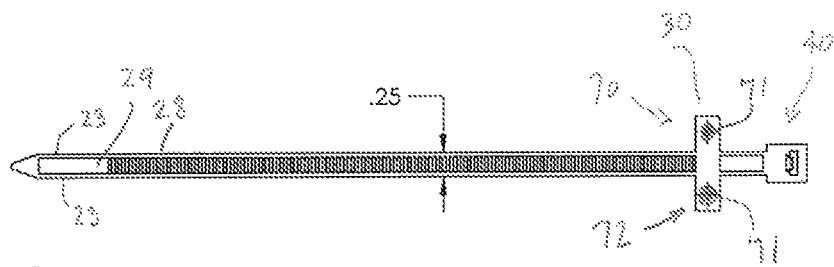
FIG. 12 is a bottom view of the cable tie device of FIG. 10.
Figure 13:
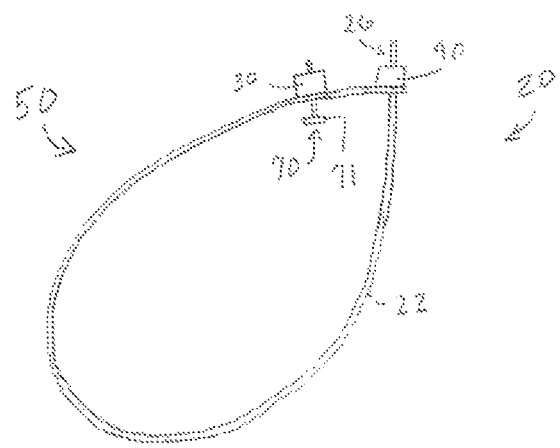
FIG. 13 is an elevation view of the cable tie device of FIG. 10 in a use mode.

In reference to FIGS. 10-13, a first fastener, such as a fastener 70 positioned through a first shoulder passageway 34, and a second fastener, such as a fastener 72 positioned through a second shoulder passageway 36, may be driven into an object such as a stud 61 or other object having a surface 60. In one aspect fasteners 70, 72 are nails positioned in passageways 34, 36 and are pounded into a stud 61 to affix electrical wiring or conduit 62. Fasteners may also include screws or a staple or other fastener. As shown in FIGS. 4, 10, 13, fasteners have a generally pointed terminal end.

FIG. 10 is a perspective view in accordance with a further aspect of the invention where clip 20 includes a fastener 70.

In one aspect fastener 70 is a molded-in-place fastener 70. For instance, during the manufacture of clip 20, fastener is molded into position during the forming process. Fastener 70 is held into position so that it may not be readily removed. Rather, molded-in-place fastener 70 is conveniently available for use and insertion because it is already positioned within a first shoulder passage 34. A tip portion of fastener 70 may protrude from the upper side 32 of shoulder 30. In one aspect a second (or additional) fastener 72 is positioned in a shoulder passage, such as second shoulder passage 36.

FIG. 11 is an elevation view of the device 20 of FIG. 10 showing fastener 70 inserted into shoulder 30. FIG. 12 is a bottom view of the device 20 of FIG. 10 showing a pair of fasteners 70, 72 inserted into shoulder 30 and with fastener heads 71 showing. Heads 71 is one aspect are heads of fastener nails. In other aspects head 71 is a screw head of a screw fastener configured to receive an end of a screw driver for insertion. In one aspect a lower side 33 of shoulder will include a recess portion (countersunk) to receive the fastener head 71 so that bottom side 29 remains flat even when a head 71 of fastener 70 is inserted.

FIG. 13 is an elevation view illustration of the device shown in FIG. 4 where strap 22 is only partially introduced into passage 42 of head 40. Pulling free end 26 of strap 22 away from head 40 will further constrict the loop 50. Fastener 70 is shown passing through shoulder 30. As strap 22 is further introduced into head 40, loop 50 will tighten as shown in FIG. 4 and until it secures around conduit 62 as is shown in FIG. 2 and FIG. 3.

In one aspect clip 20 is a one-piece clip provided without pre-set fasteners 70, thus allowing a worker to use whatever fasteners they desire. In other aspects, clip 20 includes pre-set fasteners 70. The fasteners 70 in one aspect are set into position creating shoulder passageway 34 and/or 36. The fasteners or a single fastener 70 may be molded-in-place during manufacture of clip 20. In alternatives, the single fastener 70 or multiple fasteners 70 may be friction fit into position. In one aspect the neck portion 25 is between one inch and two inches in length. In alternatives neck portion 25 may have a longer length. Clip 20 may come in a variety of sizes to accommodate fastening of larger or smaller conduit.

Figure 14:
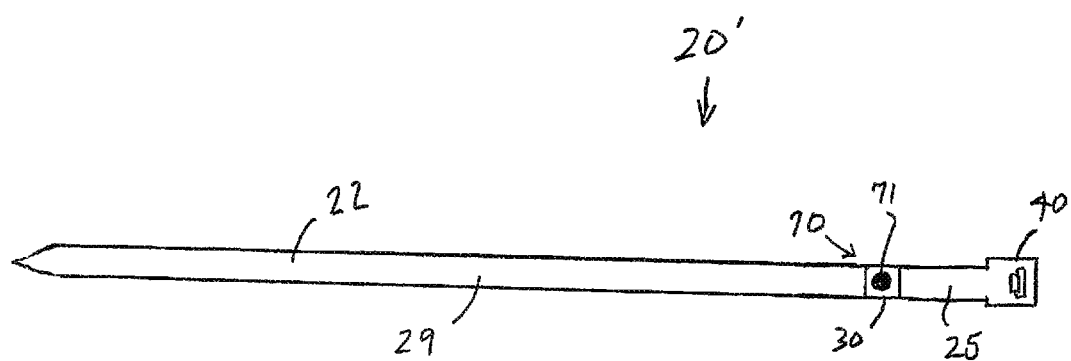
FIG. 14 is a bottom view of a cable tie device in accordance with a further aspect of the invention.

FIG. 14 is a bottom view illustrating a further clip aspect of the invention where clip 20' includes a pre-set fastener 70 positioned at shoulder 30. Fastener 70 is molded into position during manufacture of clip 20'. In a further aspect clip 20' is a one-piece clip having at least one shoulder passageway 34 configured to receive a fastener 70 (such as with the clip 20' of FIG. 14 with the fastener 70 removed). In further aspect clip 20, 20' includes a taper at an outer portion of passageway 34 to provide a countersink feature for fastener head 71. Thus, the conduit 62 will tend to lay flat against shoulder 30. A worker may insert their own fastener 70 into clip 20' at shoulder passageway 34. A fastener 70 may also include a staple. In further aspects, two or more shoulder passageways 34, 36 may be provided at shoulder 30 to receive additional fasteners. The shoulder 30 may be oriented generally perpendicular to the length of strap 22 as shown in FIG. 1, or in alternatives the shoulder 30 is oriented parallel to the length of strap 22.

In one method of operation clip 20 shown is FIG. 12 is positioned against a surface 60 with shoulder 30 aligned for fasteners 70, 72 to be inserted into a surface 60. Fastener 70 is inserted into the object by pounding with a hammer or twisting with a screwdriver, for instance. With such arrangement the clip 20 is secured to a stud 61 for instance, with the strap 22 extending outward opposite the head 40. Conduit 62 is positioned against bottom side 29 of strap 22, whereupon free end 26 of strap is inserted into passageway 42 of head 40 and tightened. In one aspect head 40 is flexed outward from surface 60 to more readily receive free end 26. In other aspects, insertion of free end 26 into passage 42 of head 40 and pulling the free end 26 through head 40 will cause loop 50 to tighten and head 40 to bend via neck 25 as shown in FIG. 4. An electrician or other worker may quickly secure conduit 62 to surface 60 with easy insertion and looping of strap 22 into head 40. Any excess strap 22 which extends past head 40 may be clipped as desired. The conduit 62 in the vicinity of the clip 20 will be positioned in a spaced relationship with respect to surface 60 of stud 61 because the shoulder 30 is positioned between the conduit 62 and surface 60.

It should be understood, of course, that the foregoing relates to exemplary embodiments of the invention and that modifications may be made without departing from the spirit and scope of the invention as set forth in the following claims.

What is claimed is:

1. A clip for affixing a conduit to a surface, the clip comprising:
    a flexible strap having an integrally connected shoulder holding first and second pre-set fasteners positioned along a common line and having a generally pointed terminal end, the shoulder positioned at a first end portion of the strap, the strap having an opposite free end extending longitudinally, the common line oriented generally perpendicular the strap; and
    a head integrally connected to the strap at the first end portion, the strap being flexible between the head and the shoulder, the head having a strap-receiving passage configured to receive the strap to form a loop.

2. The clip of claim 1 where the shoulder has a shoulder thickness greater than a thickness of the strap, the fasteners passing through the shoulder.

3. The clip of claim 1 further comprising ratchet teeth on at least one side of the strap adapted to engage with a tang within the strap-receiving passage of the head.

4. The clip of claim 1 where the first fastener is a molded-in-place fastener passing through the shoulder.

5. The clip of claim 4 where the first fastener is oriented parallel to the strap-receiving passage when the head is in a non-flexed position with respect to the shoulder.

6. The clip of claim 1 where the first fastener is one from the group of a nail and a screw.

7. A clip for affixing a conduit to a surface, the clip comprising:
    a flexible strap having an integrally connected shoulder having a first provided-in-place fastener and a second provided-in-place fastener positioned along a common line, the shoulder positioned at a first end portion of the strap, the strap having an opposite free end extending longitudinally, the common line oriented generally perpendicular the strap; and
    a head integrally connected to the strap at the first end portion, the strap being flexible between the head and the shoulder, the head having a strap-receiving passage configured to receive the strap to form a loop.

8. The clip of claim 7 where the strap has a maximum width, a distance between the first fastener and the second fastener being greater than the width.

9. A device comprising:
    a flexible clip having a head connected at a first end portion of the clip, the clip having a flexible strap at an opposite end, the strap extending longitudinally to a free end, the head having a strap-receiving passage configured to receive the free end of the strap to form a loop; and a first provided-in-place fastener and a second provided-in-place fastener passing through the first end portion, the first fastener and the second fastener lie along a common line generally perpendicular the strap, the strap being flexible between the head and the first and second provided-in-place fasteners.

10. The device of claim 9 further comprising a shoulder integrally connected to the first end portion, the first and second fastener passing through the shoulder.

11. The device of claim 10 where the shoulder has a thickness greater than a thickness of the strap.

12. The clip of claim 9 further comprising ratchet teeth on at least one side of the strap adapted to engage with a tang within the strap-receiving passage of the head.

13. The clip of claim 9 where the first fastener is one from the group of a nail and a screw, the first fastener has a fastener head positioned at a first side of the strap, the head positioned at an opposite second side of the strap.

14. The device of claim 9 where the strap has a maximum width, a distance between the first fastener and the second fastener being greater than the width.

15. The device of claim 9 where the first provided-in-place fastener is pre-set with a friction fit.

16. The device of claim 9 where the first and second fasteners are molded-in-place fasteners.

17. The device of claim 9 where the head is connected at a terminal end of the first end portion of the clip.

\* \* \* \* \*